(12) United States Patent
Sudame et al.

(10) Patent No.: US 8,073,936 B2
(45) Date of Patent: Dec. 6, 2011

(54) PROVIDING SUPPORT FOR RESPONDING TO LOCATION PROTOCOL QUERIES WITHIN A NETWORK NODE

(75) Inventors: Pradeep S. Sudame, Fremont, CA (US); Shree N. Murthy, San Jose, CA (US); Jie Cheng Jiang, San Jose, CA (US); Pauline Shuen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1266 days.

(21) Appl. No.: 11/449,406

(22) Filed: Jun. 8, 2006

(65) Prior Publication Data
US 2007/0288613 A1  Dec. 13, 2007

(51) Int. Cl.
*G06F 15/16* (2006.01)
(52) U.S. Cl. ........................................ 709/221
(58) Field of Classification Search .................. 709/200, 709/223, 226, 250
See application file for complete search history.

(56) References Cited

U.S. PATENT DOCUMENTS

| | | | |
|---|---|---|---|
| 2001/0047407 A1* | 11/2001 | Moore et al. | 709/223 |
| 2002/0075844 A1* | 6/2002 | Hagen | 370/351 |
| 2005/0128989 A1* | 6/2005 | Bhagwat et al. | 370/338 |
| 2006/0174342 A1* | 8/2006 | Zaheer et al. | 726/23 |
| 2007/0256122 A1* | 11/2007 | Foo et al. | 726/5 |

OTHER PUBLICATIONS

J. Cueller, et al.; "Geopriv Requirements;" Network Working Group; available via the Internet at Http://www.ietf.org/rfc/rfc3693.txt; Feb. 2004; pp. 1-29.
J. Polk, et al.; "Dynamic Host Configuration Protocol Option for Coordinate-based Location Configuration Information;" Network Working Group; Jul. 2004; pp. 1-15.
"Geographic Location/Privacy (geopriv);" available via the Internet at http://www.ietf.org/html.charters/geopriv-charter.html; Mar. 24, 2006; pp. 1-4.

* cited by examiner

*Primary Examiner* — Wing Chan
*Assistant Examiner* — Andrew Woo
(74) *Attorney, Agent, or Firm* — Campbell Stephenson LLP

(57) ABSTRACT

Various systems and methods are disclosed for providing support for responding to location protocol queries within a network node. One such method involves associating a location with a network identity by associating a network port with a network identity and also associating the network port with the location. The association between the network port and the network identity is created in response to a network identity, which can include an IP address, being assigned to a device coupled to the network port by an identity protocol such as DHCP. The packet is sent in response to detecting a request for the device's location. The method can be performed by various devices, including a first hop node coupled to the device, a location server, and an identity server.

18 Claims, 6 Drawing Sheets

PROVIDING SUPPORT FOR RESPONDING TO LOCATION PROTOCOL QUERIES WITHIN A NETWORK NODE

FIELD OF THE INVENTION

This invention relates to networking and, more particularly, to identifying the location of devices within a network.

DESCRIPTION OF THE RELATED ART

There are many situations in which it is desirable to know the location of a network device. For example, if a web server knows the location of a web client, the web server can provide web content that is customized to the location of each requesting client. Similarly, emergency assistance services, navigation applications, and equipment management services often benefit from having information about the geographic location of a particular device.

Existing location protocols allow location requesters (e.g., applications providing emergency services, navigation services, and the like) to send requests for the location of a device to the device in question. The device then responds with a location object, which contains information describing the geographic location of the device.

One potential drawback of existing techniques to locate devices is that they depend on the device itself being modified to implement a particular location protocol. In other words, the device to be located is responsible for maintaining its location information and for implementing a protocol that allows this location information to be provided to requesters. This limits the availability of location information in situations in which the device to be located does not support a particular location protocol. Another potential drawback of existing techniques is that, since the device being located controls the location information, it may be possible for malevolent devices to falsify location information. This undermines the credibility of the location protocol. As these examples indicate, improved techniques for providing location information to requesters are desirable.

BRIEF DESCRIPTION OF THE DRAWINGS

A more complete understanding of the present invention may be acquired by referring to the following description and the accompanying drawings, in which like reference numbers indicate like features.

Figure 1:
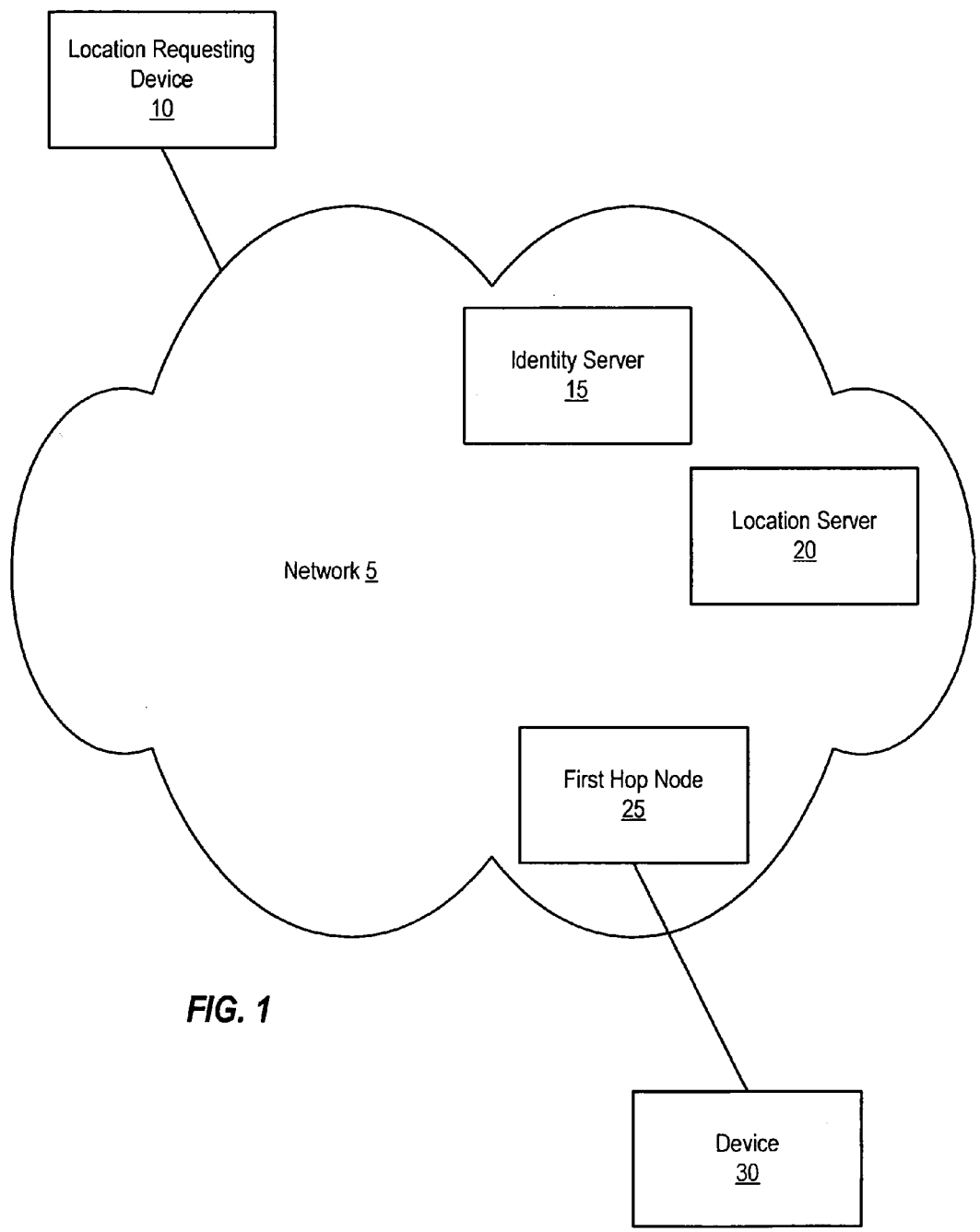
FIG. 1 is a block diagram of a network that includes a network node that supports location aware applications, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a network that supports location aware applications. As shown, network 5 couples location requesting device 10, identity server 15, location server 20, first hop node 25, and device 30.

Network 5 can include one or more local area networks (LANs) and/or wide area networks (WANs). Network 5 can be implemented using any (or a combination) of a variety of different media, including wireless links, coaxial cables, fiber optic cables, and the like. It is noted that one device (e.g., a router) can be coupled to another device either directly by a physical link or indirectly by, for example, a logical tunnel or several physical links and intervening network devices. Network 5 can include a variety of network nodes (e.g., bridges, routers, and/or switches), such as first hop node 25, as well as network servers, such as identity server 15 and location server 20, that are administered by the operators of network 5.

Location requesting device 10 can be a personal computer, a workstation, an Internet server, a network appliance, a telephone (e.g., a Voice-over-IP (VoIP) phone), a handheld computing device such as a cell phone or PDA (Personal Data Assistant), or any other type of computing device. Location requesting device 10 is a device that is configured to implement a location protocol such as Geographic Location/Privacy (Geopriv), as described in the Network Working Group Request for Comments (RFC) 3693. Location requesting device 10 can generate a location protocol packet requesting the location of another device coupled to network 5. Location requesting device 10 can be, for example, a device used by an emergency service provider, such as a provider of 911 services.

Identity server 15 is a device that is configured to implement an identity protocol, such as Dynamic Host Configuration Protocol (DHCP), that is used to assign a network identity (such as an Internet Protocol (IP) address) to an identity protocol client. A protocol client (such as device 30) sends a request, which is an identity protocol packet that requests identity information from protocol server 15. In response to the request, identity server 15 can send a response, which is a location protocol packet containing the requested identity information, to the protocol client.

Location server 20 implements the location protocol and is configured to respond to protocol requests by providing location information describing the location of a device. Other devices, such as device 30, can also be configured to act as location servers (e.g., device 30 can act as a location server with respect to its own location). In some embodiments, location server 20 obtains location information, which identifies the location of each of one or more devices, from a location database (e.g., a database, accessible to and/or included in location server 20, that stores information identifying the location of each of one or more devices).

First hop node 25 is a network device, such as a router or switch, that is directly coupled to device 30. Node 25 is the "first hop" network device relative to device 30.

Device 30 is a device that is coupled to network 5 via first hop node 25. Device 30 can be a personal computer, a workstation, an Internet server, a network appliance, a telephone (e.g., a Voice-over-IP (VoIP) phone), a handheld computing device such as a cell phone or PDA (Personal Data Assistant), or any other type of computing device.

Various network devices in the system of FIG. 1 can be configured to "snoop" (e.g., by detecting and parsing particular types of packets) identity and/or location protocol packets being sent via network 5. Such a network device detects such protocol packets, extracts information from those protocol packets, and associates the extracted information with the network port (in first hop node 25) that is directly coupled to device 30. Once both identity information and location information have been associated with the same network port, the location information associated with that port is effectively associated with the identity information associated with that port. Information identifying a location and identity associated with a particular port can be stored by the network device, as described in more detail below with respect to FIG. 2.

Accordingly, if location requesting device 10 requests the location of device 30 using the identity assigned to device 30 by the identity protocol, a network device can locate the location information that is associated with the same network port as the identity and include that information in location protocol response identifying the location of device 30. Since the network device is part of network 5, the network device can be trusted not to falsify location information. Additionally, since the network device is configured to support the location protocol, location requesting device 10 can obtain the location of device 30 from the network device, even if device 30 does not itself support the location protocol.

As an example, first hop node 25 can be configured to detect and parse an identity protocol packet being sent between identity server 15 and device 30. In response to detecting the identity protocol packet, first hop node 25 extracts identity information (e.g., an Internet Protocol (IP) address assigned by identity server 15 and/or a Media Access Control (MAC) address used by device 30) identifying device 30 from the identity protocol packet and stores the extracted information. The extracted information is associated with the network port (within first hop node 25) that is coupled to device 30. Accordingly, whenever identity server 15 and device 30 exchange identity protocol packets corresponding to device 30, first hop node 25 can snoop the exchanged identity protocol packets in order to associate the identity contained in those packets with the network port coupled to device 30. In some embodiments, first hop node 25 is a network router configured to implement DHCP snooping, which is a feature available from Cisco Systems, Inc. of San Jose, Calif. DHCP snooping can be used to snoop the identity protocol packets (e.g., by identifying identity protocol packets and parsing information within the identified packets), to extract identity protocol information from the identified protocol packets, and to store information associating the extracted identity information with the network port coupled to device 30.

In addition to being configured to snoop identity protocol packets, first hop node 25 is configured to associate the network port coupled to device 30 with location information indicative of the location of device 30. This in turn allows first hop node 25 to associate the location information with the identity (as specified in the stored identity information) of device 30, since the identity is also associated with the network port.

First hop node 25 can obtain the location information to be associated with the network port coupled to device 30 in a variety of different ways. In some embodiments, first hop node 25 is configured with location information by a network administrator. This location information can be generic to all ports within first hop node 25 or specific to individual ports (i.e., in the latter situation, a separate piece of location information can be associated with each of several different network ports).

In other embodiments, first hop node 25 obtains the location information by snooping packets. For example, in one embodiment, identity server 15 is also a location server (in such an embodiment, location server 20 can be omitted), such that identity server 15 can send both identity information and location information to device 30 in an identity protocol packet. In such an embodiment, first hop node 25 can extract both the identity and the location information from the identity protocol packet being sent from identity server 15 to device 30.

Similarly, in another embodiment, before assigning an identity to device 30, identity server 15 can request the location of device 30 from location server 20. Identity server can then insert the location information received from location server 20 into the identity protocol packet sent to device 30. First hop node 25 can then extract the identity and the location from the identity protocol packet.

First hop node 25 can be configured to implement the location protocol. Accordingly, first hop node 25 can respond to location protocol requests that use the identity assigned by the identity protocol to specify device 30. These location protocol requests can be received from third-party devices, such as location requesting device 10, as well as from device 30 itself. In response to detecting a location protocol request for the location of device 30, first hop node 25 can use the identity contained in the location protocol request to select the associated network port. First hop node 25 can then access the location information associated with that network port and send the location information to the requesting device.

Because first hop node 25 is part of network 5, first hop node 25 is likely to be a more trusted device than device 30. In other words, since first hop node 25 (unlike device 30) is under the direct control of the network administrators of network 5, first hop node 25 can be trusted to not generate false location information. Thus, when first hop node 25 provides location information on behalf of device 30, that location information can be relied upon.

Additionally, since first hop node 25 can respond to location requests specifying device 30, device 30 does not need to implement the location protocol in order for other devices to be able to locate device 30. Accordingly, this ability of a first hop network node to respond to location requests can increase the number and/or types of devices that can be located using the location protocol.

In one embodiment, first hop node 25 is configured to snoop location protocol packets being sent to device 30. If a location request is sent to device 30, first hop node 25 captures the location request and generates a location protocol response on behalf of device 30. Thus, in addition to (or instead of) being able to respond to location protocol requests for the location of device 30 that are sent to first hope node 25, first hop node 25 can also respond to location protocol requests that are sent to device 30.

In some embodiments, in order to protect the privacy of user(s) of device 30, first hop node 25 is configured to only provide location information describing the location of device 30 to trusted requesters (i.e., in such embodiments, no location information is provided to non-trusted requesters). Alternatively, first hop node 25 can be configured to provide different granularities of location information to different types of requesters, such that more precise location information is provided to trusted requesters and less precise information is provided to non-trusted requesters. For example, first hop node 25 can provide location information identifying the street address of device 30 to trusted requesters while providing location information identifying only the state in which device 30 is located to non-trusted requesters. If global positioning system coordinates are used as the location information, first hop node 25 can round the coordinates to one number of significant digits when responding to trusted requesters and another number of (fewer) significant digits when responding to non-trusted requesters. Requesters can be identified as trusted requesters based on, for example, the network in which the requesters are located (e.g., requesters in the same corporate intranet as device 30 could be considered trusted, while requesters outside of that intranet could be considered non-trusted). In some embodiments, first hop node 25 is configured to always treat emergency service providers (such as 911 services) as trusted requesters.

In one embodiment, the location protocol includes functionality that allows device 30 to send privacy preferences to first hop node 25. For example, the location protocol can include a special message type (i.e., the location protocol can define a special type of message) for transmitting privacy preferences. The privacy preferences can indicate the granularity of location information to be provided to different types of requesters. The privacy preferences can also indicate that no location information should be provided to certain types of requesters (e.g., non-trusted requesters). First hop node 25 can store the privacy preferences and use those preferences when determining the granularity of location information, if any, to return to location requesters who have requested the location of device 30.

While the above example shows how first hop node 25 can be configured to respond to location queries for the location of device 30, other network devices within network 5 can also be configured in that manner, instead of and/or in addition to first hop node 25. For example, identity server 15 and/or location server 20 can be configured to respond to location protocol requests for the location of device 30. In such a situation, first hop node 25 can forward information identifying the network port (within first hop node 25) coupled to device 30 to identity server 15 and/or location server 20. For example, if device 30 sends an identity protocol request to identity server 15, first hop node 25 can receive the identity protocol request, insert information identifying the network port coupled to device 30, and forward the modified identity protocol request to identity server 15. Identity server 15 can then extract the information identifying the network port from the identity protocol request and associate that network port with the network identity (e.g., an IP address) that identity server 15 is assigning to device 30. Identity server 30 can then also associate location information with that network port (e.g., using one of the techniques described above with respect to first hop node 25). In one embodiment, first hop node 25 uses an implementation of DHCP snooping to obtain the identity information associated with the network port and to forward that information to other network nodes. More specifically, first hop node 25 can implement "option 82," available from Cisco Systems, Inc. of San Jose, Calif.

Similarly, first hop node 25 can forward the information identifying the network port to which device 30 is coupled to location server 20 (e.g., by inserting the information identifying the network port in a location protocol request). Alternatively, identity server 15 can provide this information to location server 20. For example, identity server 15 can receive information identifying the network port from first hop node 25, and then send a location protocol request specifying that network port to location server 20. Location server 20 can access location information associated with that network port and return the information to identity server 15, which can in turn send that location information to device 30 as part of an identity protocol response. Identity server 15 can also provide location server 20 with the identity information being assigned to the device, allowing location server 20 to associate that identity information with the network port as well as the location information associated with the network port.

Figure 2:
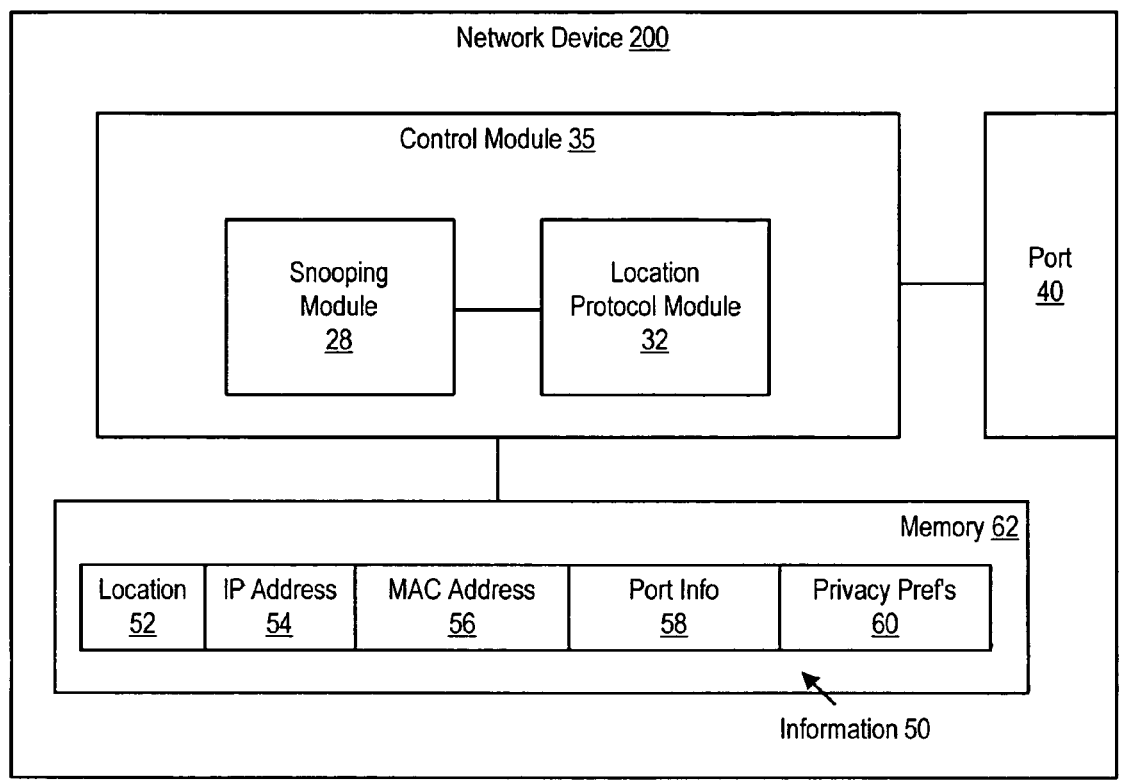
FIG. 2 is a block diagram of a network device that is configured to snoop location requests, according to one embodiment of the present invention.

FIG. 2 is a block diagram of a network device 200 that is configured to respond to location protocol requests for the location of a device, such as device 30 of FIG. 1. Network device 200 can be used to implement network devices such as, for example, first hop node 25, identity server 15, and/or location server 20 of FIG. 1. Network device 200 of FIG. 2 includes a control module 35, which includes snooping module 37 and location protocol module 39. Control module 35 is coupled to a port 40. Port 40 can be connected to a device (such as device 30 of FIG. 1) by one or more network links (e.g., a coaxial cable, wireless link, fiber optic link, or the like). Control module 35 is also coupled to access (e.g., read and/or write) information 50.

Control module 35 includes functionality for performing forwarding and/or routing within network device 200. Additionally, control module 35 includes snooping module 37 and location protocol module 39. Snooping module 37 is configured to "snoop" packets received by network device 200 by examining all packets received by network device 200 in order to detect certain types of packets. For example, snooping module 37 can examine each packet in order to detect identity protocol packets and location protocol packets (such packets can be detected based on information, such as a User Datagram Protocol (UDP) destination port, header option, or message type, contained within each packet).

In one embodiment, snooping module 37 can be implemented using a CAM (Content Addressable Memory) and/or ACL (Access Control List) configured to detect particular types of packets. For example, information from each packet received by network device 200 can be input into a CAM, which responds by outputting a corresponding index, which is then used to lookup information in an ACL. If the packet is one of the desired types of protocol packet, the indexed information in the ACL may indicate that the protocol packet should be further processed by snooping module 37. Alternatively, snooping module 37 can be implemented as a software process that analyzes each packet in order to identify which packets are protocol packets. Snooping module 37 can include a queue (not shown) to temporarily buffer protocol packets from which identity and/or location information is to be extracted.

Once a particular type of packet is detected, snooping module 37 can perform various actions. For example, if an identity protocol packet is detected, snooping module 37 can extract identity information from the packet and store that identity information as part of information 50. Similarly, if a location protocol packet is detected, snooping module 37 can extract location information from the packet and store the location information as part of information 50. Instead of extracting information in response to certain types of packets, snooping module 37 can also initiate other actions (e.g., such as notifying location protocol module 39 if a location protocol packet containing requests for the location of a device is received). For example, snooping module 37 can insert information (e.g., identifying the network port that received the identity protocol packet) into the identity protocol packet before forwarding the identity protocol packet.

Information 50 represents the types of information that can be generated and/or stored by snooping module 37. Each set of information 50 is associated with a particular device (e.g., device 30 of FIG. 1). As shown, information 50 associated with the device can include location information 52, identity information such as IP address 54 and MAC address 56, port information 58 identifying an network port, and/or privacy preferences 60. It is noted that at any given time, network device 200 can maintain several sets of information 50, each for a different device. If network device 200 is a first hop node with respect to the device associated with information 50, port information 58 identifies a network port (e.g., such as port 40) within network device 200. If network device 200 is not the first hop node for the device, port information 58 identifies a network port within the first hop node (in that situation, port information 58 can also identify the first hop node). In such a situation, port information 58 can be extracted from a packet that was modified by the first hop node to include the port information (e.g., using DHCP snooping and/or DHCP snooping "option 82").

In one embodiment, network device 200 is directly coupled to the device and snooping module 37 obtains MAC address 56 and interface information 58 from a DHCP request (or other identity protocol request) generated by the device. In this embodiment, snooping module can obtain IP address 54 from a DHCP response generated by the DHCP server. In other embodiments, network device 200 is not directly coupled to the device. In such embodiments, network device 200 receives such identity information from another node (e.g., from first hop node 25 of FIG. 1) that is directly coupled to the device.

Location information 52 can be extracted from a packet generated by another network device or, if network device 200 is the first hop node with respect to the device, programmed into network device 200 (e.g., by a network administrator) or retrieved from a database within the network. Alternatively, network device 200 can include a Global Positioning Service (GPS) receiver that obtains location information 52 (in such an embodiment, the same location information 52 can be used for each device that is connected to network device 200) for directly-coupled devices. In one embodiment, individualized location information 52 is available on for each interface within network device 200. In other embodiments, a single piece of location information is used to describe the location of all devices that are directly coupled to network device 200. If network device 200 is a first hop node for one or more devices, a location database can be maintained by network device 200 for each interface within network device 200 that is currently coupled to a device. Alternatively, a remote server (e.g., identity server 15 and/or location server 20 of FIG. 1) can maintain a database of location information for one or more devices. In such an embodiment, network device 200 can either request the location information for a particular device (e.g., using the identity assigned to that device) from the remote server or extract the location information from location and/or identity protocol packets being sent to the device from the remote server.

Location information 52 can include one or more different types of information, such as civil location information (e.g., street address, building and/or floor address, and the like), geographical location information (e.g., latitude and longitude), network-specific information (e.g., identifying a network node and a port within that node), and the like. In general, location information 52 identifies the location (or at least the approximate location) of a device. Throughout this document, unless a particular type of location information (e.g., geographic, civil, or network) is specified, the term "location information" describes any information (which can include, for example, geographic location, civil location, and/or network location information) that describes the location of a device.

Each set of location information 52 can include (or be manipulated to provide) multiple different location granularities. The location information 50 can identify, for example, a street address, city, state, and country. Certain location requesters can receive the full location, while other location requesters will receive coarser granularity location information (e.g., just city and/or state information) based on privacy preferences 60. Privacy preferences 60 can indicate the granularity of location information to be provided to different types of requesters. Privacy preferences 60 can also indicate whether any location information at all should be provided to certain types of requesters. Privacy preferences 60 can be configured by an administrator or extracted from a location protocol packet sent by the device represented by information 50.

Location protocol module 39 is configured to participate in a location protocol such as Geopriv. Location protocol module 39 can act as a location protocol client and/or a location protocol server. In some embodiments, location protocol module 39 is configured to participate in mutual authentication of another device (which is acting as a server or client with respect to network device 200) before exchanging location information with that device. Location protocol module 39 is configured to generate and/or modify location protocol packets.

In one embodiment, location protocol module 39 is configured to generate location protocol requests that request the location of a device coupled to network device 200 (e.g., the obtained location information can be stored as location information 52). For example, each time a new set of information 50 is created for a device and the identity of that device is obtained, control module 35 can instruct location protocol module 39 to request the location of that device.

Location protocol module 39 is configured to respond to location protocol requests sent by a location protocol requester to network device 200. In such an embodiment, the location protocol request specifies the identity of the device whose location is requested. Location protocol module 39 can use the identity to select the set of information 50 that contains that identity. Location protocol module 39 can then access the privacy preferences 60 (if any) and the location information 52 within that set of information 50 and generate an appropriate location protocol response that contains the requested location and complies with the privacy preferences. If location information 52 is not yet available, location protocol module 39 can request the location (using the identity and/or network port associated with the network device) from a location server, and then return the received location to the requester.

In still other embodiments, location protocol module 39 is configured to respond to a location protocol request that is sent to a connected device, which is a device that is connected to the location protocol requester by network device 200. In these embodiments, location protocol module 39 can generate a location protocol response (using the same techniques described above) on behalf of the connected device. In such an embodiment, the location protocol request is not forwarded to the connected device.

Information 50 is stored in a memory 62, which can be internal to network device 200 (as shown in FIG. 2) or accessible to network device 200 (e.g., via a bus or network). Memory 62 can include volatile storage (e.g., Random Access Memory (RAM)) and/or non-volatile storage (e.g., such as a hard disk). In one embodiment (e.g., if network device 200 is a first hop node), information 50 can be maintained as part of the information that is generated by a snooping feature (such as DHCP snooping). In such an embodiment, the identity information (e.g., IP address 54 and MAC address 56) can be obtained by snooping identity protocol packets. The location information can be obtained via administrator configuration, by snooping location protocol packets being sent to the device being located, by using a location protocol to request the location information from a location server, or by snooping identity protocol packets that also include location information. In this situation, information 50 can include the standard fields (e.g., for identity and port information) used by the snooping feature as well as additional fields for location information and/or security preferences.

In other embodiments (e.g., if network device 200 is an identity server), information 50 can be maintained as part of the information that is used to respond to identity protocol requests. In such an embodiment, information 50 can include the standard fields used by the identity protocol as well as additional fields for location information and/or security preferences. The network device can obtain the port information by using a feature such as DHCP snooping "option 82," which allows a first hop node to inform other nodes of the port to which a device is coupled. The network device can obtain the location information by, for example, using a location protocol to request the location information from a location server or via administrator configuration.

In still other embodiments (e.g., if network device 200 is a location server), information 50 can be maintained as part of the information (e.g., in a location database) that is used to respond to location protocol requests. In such an embodiment, information 50 can include the standard fields used by the location protocol as well as additional fields for the port information. The network device can obtain the location information via, for example, administrator configuration. The network device can obtain the port information by using a feature such as DHCP snooping "option 82."

Figure 3:
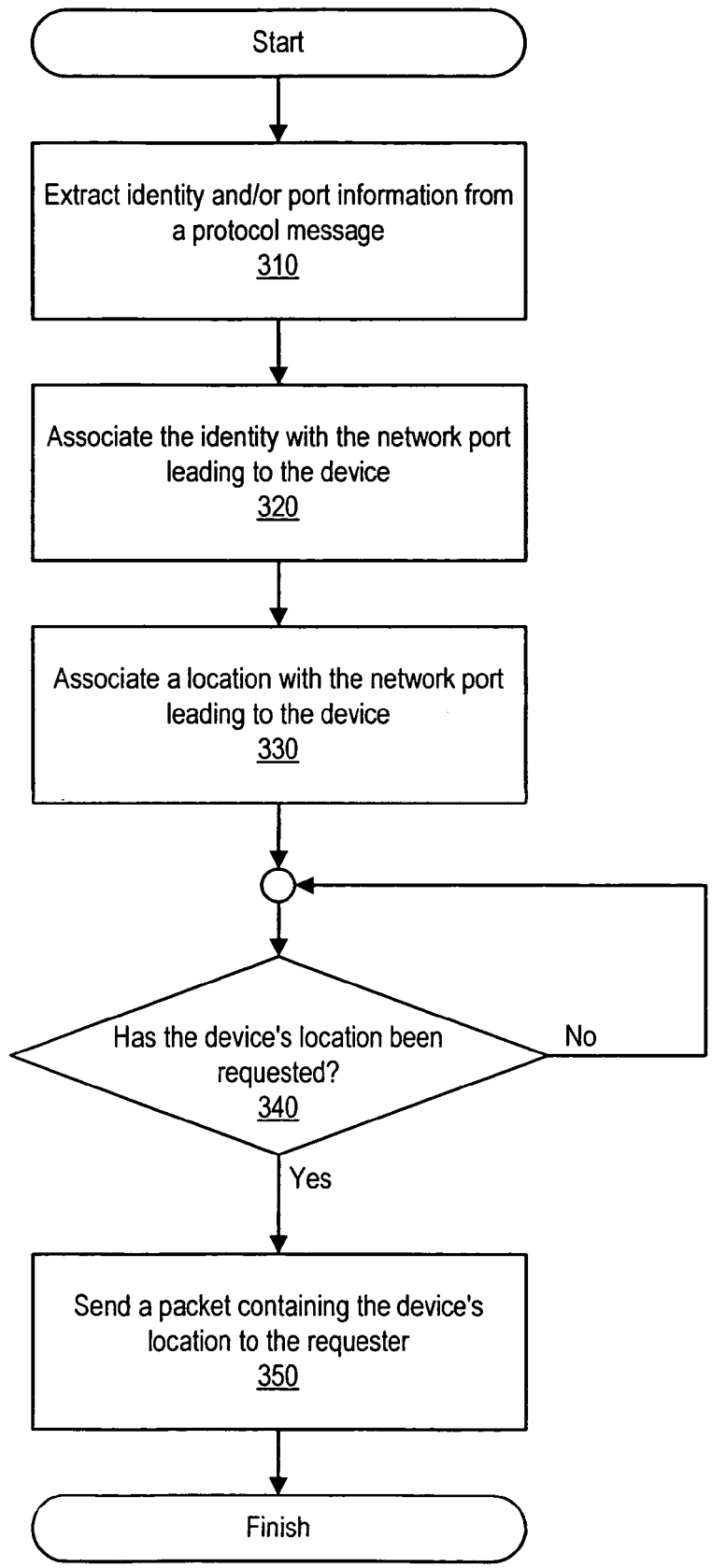
FIG. 3 is a flowchart of a method of providing location information to location aware applications, according to one embodiment of the present invention.

FIG. 3 is a flowchart of a method of providing location information to location aware applications. This method can be performed by a network device such as network device 200 of FIG. 2. The network device can be, for example, a first hop node connected to a device, a location server that stores information describing the location of the device, or an identity server that assigns a network identity to the device.

The method begins at 310, when the network device extracts identity information and/or port information from a protocol packet. The protocol packet can be an identity protocol packet (e.g., a DHCP packet) or a location protocol packet (e.g., a Geopriv packet). The identity information can include, for example, an IP address that has been assigned to a device. The port information includes information identifying the network port within the first hop node (relative to the device) that is directly coupled to the device. It is noted that the protocol packet can include identity information, port information, or both identity and port information.

The network device then associates the identity extracted from the protocol packet with a network port that leads to the device, as shown at 320. The network port can be the port that is identified in the port information (if any) extracted at 310. Alternatively (e.g., when the method is performed by a first hop node coupled to the device), the network port is the port that is directly coupled to the device.

At 330, a location is associated with the network port leading to the device. This location can be obtained through configuration (e.g., as received from a network administrator or GPS receiver) or by snooping location and/or identity protocol packets. The location can also be obtained by requesting the location from a location server.

If the device's location is subsequently requested, as determined at 340, a packet containing information identifying the device's location is sent to the requester. The request for the device's location can be detected by either direct receipt of a location protocol request or by snooping a location protocol request. The request identifies the device using the identity that was associated with the network port at 320. This identity is used to select the set of information associated with the network port, which also includes the location associated with the network port. That location is returned to the requester. The returned location can be modified (or even omitted), depending upon privacy preferences associated with the device.

Figure 4:
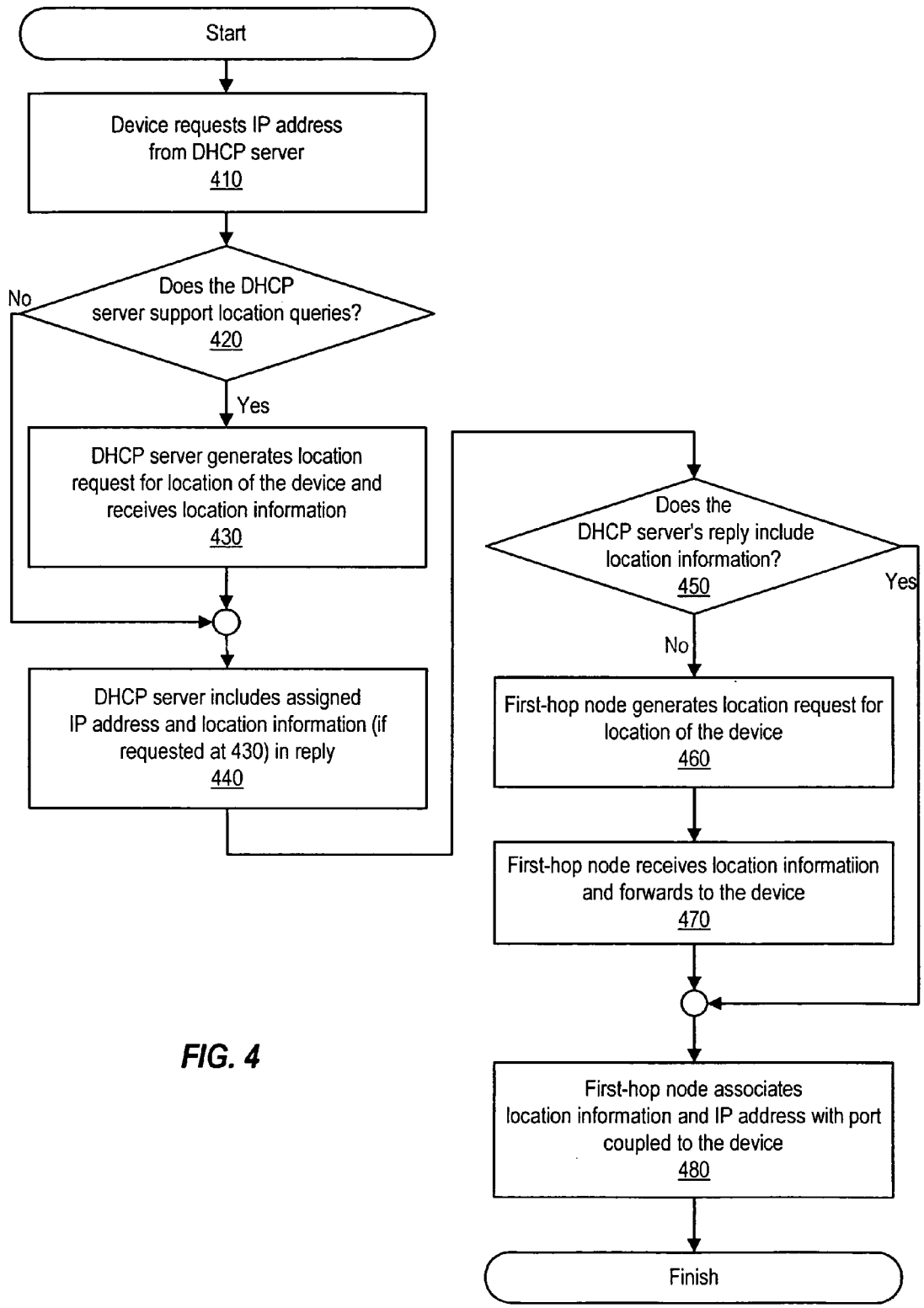
FIG. 4 is a flowchart of a method of providing location information

FIG. 4 is a flowchart of another method of providing location information describing the location of a device to location aware applications. The method of FIG. 4 can be performed by a network such as the one illustrated in FIG. 1. For example, operation 410 can be performed by device 30, operations 420-440 can be performed by identity server 15, and operations 450-480 can be performed by first hop node 25.

The method begins at 410, when the device requests an IP address from a DHCP server. If the DHCP server supports location queries, as determined at 420, the DHCP server sends a location request for the location of the device to a location server. The DHCP server then receives the requested location from the location server.

In response to the device's request (generated at 410), the DHCP server includes the assigned IP address in a reply that is sent to the device, as shown at 400. If the DHCP server requested location information at 430, the location information is also included in the reply that is sent to the device.

If the reply does not include the location information, as determined at 450, the first hop node generates a request for the location of the device, as shown at 460, and sends the request to a location server (if the first hop node already has location information for the device, operations 460 and 470 can be omitted). The first hop node then receives the location information and, optionally, forwards it to the device, as shown at 470. The first hop node the associates the location information (either received from the location server, extracted from the DHCP server's reply, or obtained locally) with the IP address included in the DHCP server's reply as well as the network port that is connected to the device. Based on this association, the first hop node can respond to location requests for the location of the device.

Figure 5:
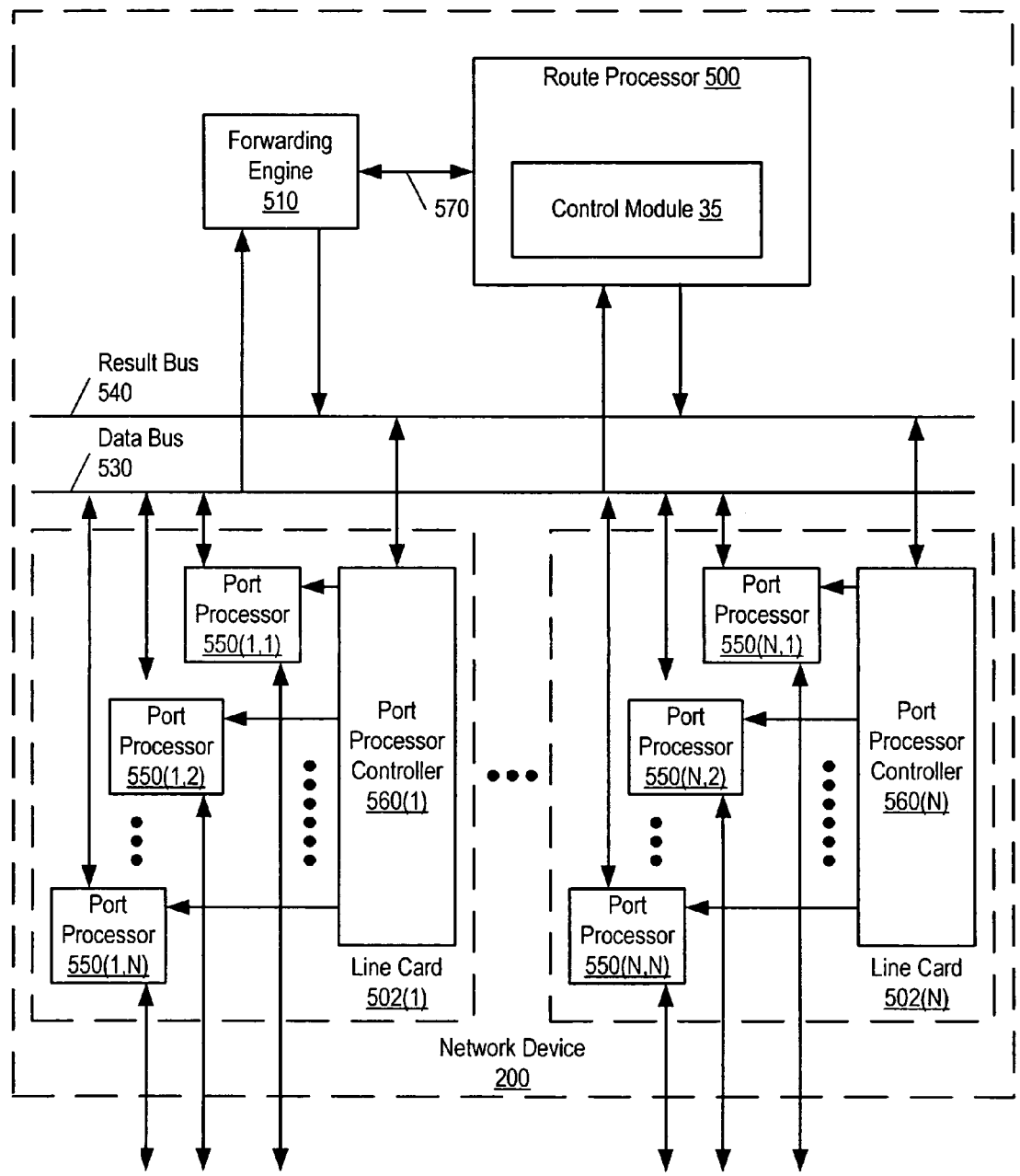
FIG. 5 is a block diagram of a network device, according to one embodiment of the present invention.

FIG. 5 is a block diagram of a network device 200 (e.g., network device 200 of FIG. 2). In this depiction, network device 200 includes a number of line cards (line cards 502(1)-502(N)) that are communicatively coupled to a forwarding engine 510 and a route processor 500 via a data bus 530 and a result bus 540. Route processor 500 can include control module 35 of FIG. 2 (control module 35 can alternatively be implemented, in full or in part, in forwarding engine 510).

Line cards 502(1)-502(N) include a number of port processors 550(1,1)-550(N,N) (e.g., such as port 40 of FIG. 2) which are controlled by port processor controllers 560(1)-560(N). It will also be noted that forwarding engine 510 and route processor 500 are not only coupled to one another via data bus 530 and result bus 540, but are also communicatively coupled to one another by a communications link 570. It is noted that in alternative embodiments, each line card can include a forwarding engine.

When a packet is received, the packet is identified and analyzed by a network device in the following manner, according to embodiments of the present invention. Upon receipt, a packet (or some or all of its control information) is sent from the one of port processors 550(1,1)-550(N,N) at which the packet was received to one or more of those devices coupled to data bus 530 (e.g., others of port processors 550 (1,1)-550(N,N), forwarding engine 510 and/or route processor 500). Handling of the packet can be determined, for example, by forwarding engine 510. For example, forwarding engine 510 may determine that the packet should be forwarded to one or more of port processors 550(1,1)-550(N,N). This can be accomplished by indicating to corresponding one(s) of port processor controllers 560(1)-560(N) that the copy of the packet held in the given one(s) of port processors 550(1,1)-550(N,N) should be forwarded to the appropriate one of port processors 550(1,1)-550(N,N).

Forwarding engine 510 and/or route processor 500 can also be configured to snoop identity and/or location protocol packets, and to implement techniques such as the aforementioned DHCP snooping and/or DHCP snooping "option 82." Accordingly, when location and/or identity protocol packets are received via port processors 550(1,1)-550(N,N), the protocol packets can be parsed and any identity and/or location information contained within those packets can be extracted and associated with the receiving port processor. Alternatively (or additionally), the protocol packets can be modified (e.g., according to "option 82") to include information identifying network node 200 and/or the receiving port processor before being forwarded.

Figure 6:
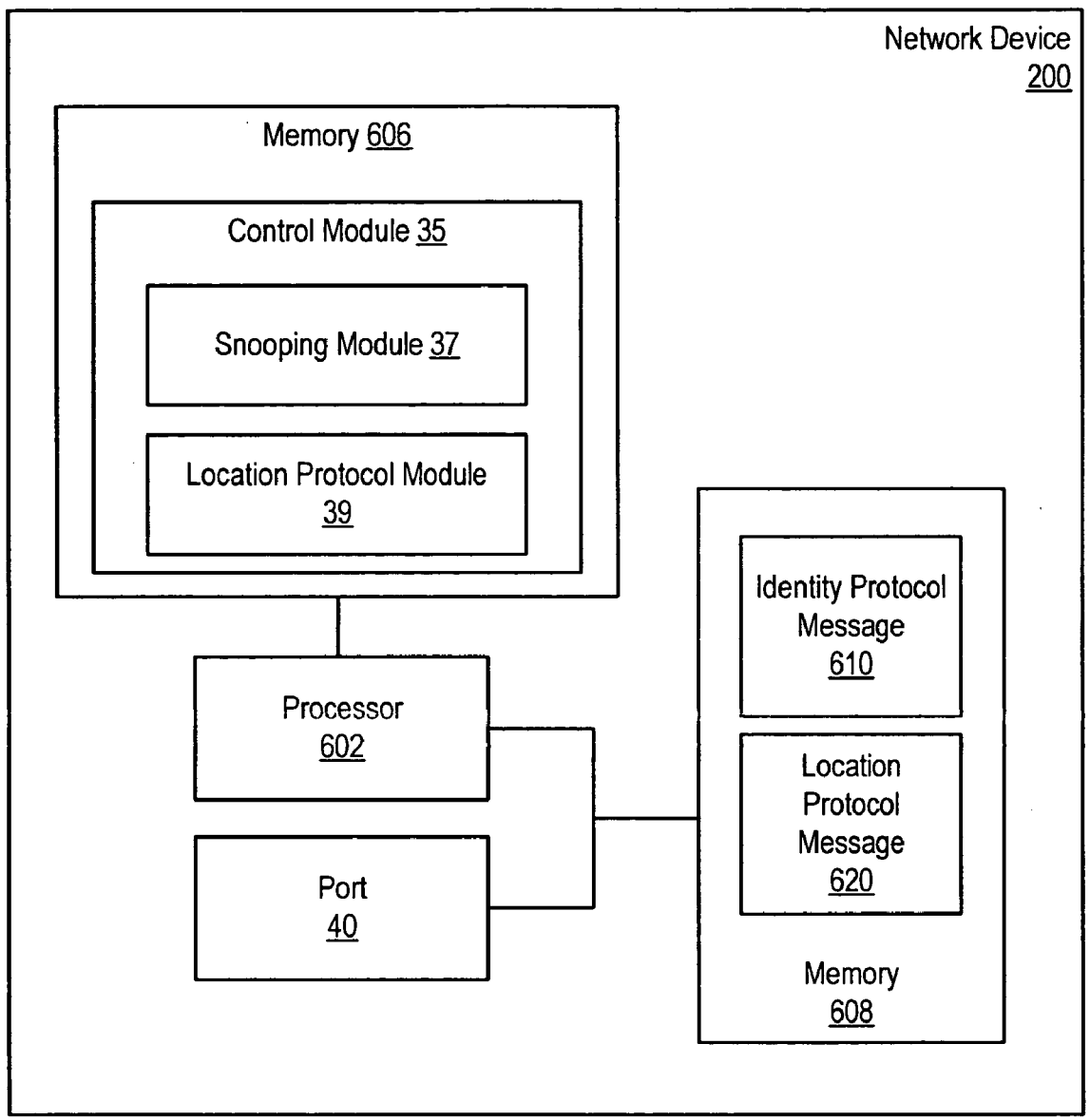
FIG. 6 is another block diagram of a network device, illustrating how certain functionality can be implemented in software in some embodiments of the present invention.

FIG. 6 illustrates a block diagram of a network device 200, which illustrates how at least a portion of control module 25 (as shown in FIG. 2) can be implemented in software. As illustrated, network device 200 includes one or more processors 602 (e.g., microprocessors, PLDs (Programmable Logic Devices), or ASICs (Application Specific Integrated Circuits)) configured to execute program instructions stored in memory 606. Memory 606 can include various types of RAM (Random Access Memory), ROM (Read Only Memory), Flash memory, MEMS (Micro Electro-Mechanical Systems) memory, and the like. Processor 602, memory 606, and port 40 (e.g., one of port processors 550(1,1)-550(N,N) of FIG. 5) are coupled to send and receive data and control signals by a bus or other interconnect. Packets, such as identity protocol packet 610 and location protocol packet 620, received via port 40 can be stored in memory 608 for processing by control module 35.

In this example, program instructions executable to implement control module 35, including snooping module 37 and location protocol module 39, are stored in memory 606. The program instructions and data implementing control module 35 can be stored on various computer readable media such as memory 606. In some embodiments, control module 35 software is stored on a computer readable medium such as a CD (Compact Disc), DVD (Digital Versatile Disc), hard disk, optical disk, tape device, floppy disk, and the like). In order to be executed by processor 602, the instructions and data implementing control module 35 are loaded into memory 606 from the other computer readable medium. The instructions and/or data implementing control module 35 can also be transferred to node 12 for storage in memory 606 via a network such as the Internet or upon a carrier medium. In some embodiments, a computer readable medium is a carrier medium such as a network and/or a wireless link upon which signals such as electrical, electromagnetic, or digital signals, on which the data and instructions implementing control module 35 are encoded, are conveyed.

For purposes of this disclosure, a "packet" may include a cell, datagram, frame, segment, message, or any other logical grouping of information that is conveyed via a network. Network nodes within the network perform any variety of functions, such as switching, bridging, routing, and other such functions in order to convey packets from a source to a destination.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    associating a network identity of a first device with a location of the first device, wherein the location is a geographic location or a civil location, and wherein the network identity is an Internet Protocol (IP) address;
    selecting a location granularity, wherein the selected location granularity identifies the location with either more precision or less precision, wherein information identifying the location conforms to the selected location granularity, and the selected location granularity is selected based on an identity of a device requesting the information identifying the location; and
    sending a packet, wherein the packet comprises the information identifying the location and the network identity, wherein the associating the network identity with the location comprises:
        storing a set of information identifying a network port of a second device and the network identity of the first device in response to detecting an identity protocol packet being sent to the first device, wherein an identity protocol assigns the network identity to the first device, and wherein the first device is coupled to the network port of the second device; and
        adding the information identifying the location of the first device to the set of information, wherein the associating the network identity with the location is performed by a device other than the first device.

2. The method of claim 1, wherein the identity protocol is a dynamic host configuration protocol (DHCP).

3. The method of claim 2, further comprising:
    extracting the information identifying the location from a location protocol packet being sent from a location server to the first device.

4. The method of claim 2, further comprising:
    extracting the information identifying the location from a DHCP packet being sent to the first device.

5. The method of claim 2, further comprising:
    requesting the location from a location server.

6. The method of claim 5, wherein
    the requesting the location from the location server comprises sending a location protocol packet; and
    the location protocol packet comprises information identifying the network port.

7. The method of claim 2, wherein
    the packet is sent in response to detecting a location protocol request; and
    the location protocol request comprises the network identity of the first device.

8. The method of claim 7, wherein
    the location protocol request is being sent to the first device; and
    the packet is sent by a first hop node coupled to the first device.

9. A network device comprising:
a port; and
a control module coupled to the port, wherein the control module is configured to
store a set of information identifying a network identity of a first device and a network port of a second device in response to detecting an identity protocol packet being sent to the first device,
wherein an identity protocol assigns the network identity to the first device,
wherein the network identity is an IP address,
wherein the first device is coupled to the network port of the second device, and
wherein the network device is not the first device;
add information identifying a location of the first device to the set of information, wherein the location is a geographic location or a civil location, wherein the network identity is associated with the location as a result of both the network identity and the location being associated with the network port;
send a packet in response to receiving a location protocol request from a requesting device, wherein the packet comprises information identifying the location and the network identity; and
select a location granularity, wherein the selected location granularity identifies the location with either more precision or less precision, wherein the information identifying the location conforms to the selected location granularity, and wherein the selected location granularity is selected based upon a security preference associated with the first device and an identity of the requesting device.

10. The network device of claim 9, wherein the identity protocol is a dynamic host configuration protocol (DHCP).

11. The network device of claim 10, wherein
the control module comprises a snooping module;
the network device is a first hop node coupled to the first device;
the network device is the second device; and
the network device comprises the network port.

12. The network device of claim 11, wherein
the snooping module is configured to extract the information identifying the location from a location protocol packet being sent from a location server to the first device.

13. The network device of claim 11, wherein
the snooping module is configured to extract the information identifying the location from a DHCP packet being sent to the first device.

14. The network device of claim 11, wherein
the control module is configured to request the location from a location server.

15. The network device of claim 11, wherein the control module is configured to:
send a packet in response to receiving a location protocol request from a requesting device, wherein
the packet comprises information identifying the location and the network identity;
the packet is sent in response to detecting a location protocol request; and
the location protocol request comprises the network identity of the first device.

16. The network device of claim 15, wherein
the snooping module is configured to detect the location protocol request; and
the location protocol request is being sent to the first device.

17. The network device of claim 10, wherein
the network device is one of: an identity server and a location server;
the control module is configured to extract information identifying the network port from a packet; and
the packet was modified to include the information identifying the network port by a first hop node coupled to the first device.

18. A system comprising:
means for selecting a location granularity, wherein the selected location granularity identifies a location of a first device with either more precision or less precision, wherein information identifying the location conforms to the selected location granularity, and the selected location granularity is selected based on an identity of a device requesting the information identifying the location;
means for sending a packet, wherein the packet comprises the information identifying the location and the network identity; and
means for associating the network identity of the first device with the location, wherein the location is a geographic location or a civil location, wherein the network identity is an IP address, and wherein the means for associating the network identity with the location comprises:
means for storing a set of information identifying a network port of a second device and the network identity in response to detecting an identity protocol packet being sent to the first device, wherein an identity protocol assigns the network identity to the first device, and wherein the first device is coupled to the network port of the second device; and
means for adding information identifying the location of the first device to the set of information, wherein a device other than the first device comprises the means for associating the network identity with the location.

* * * * *